US005881483A

United States Patent [19]

[11] Patent Number: 5,881,483
[45] Date of Patent: Mar. 16, 1999

Lee et al.

[54] MEANS FOR AND METHODS OF CONVEYING INFORMATION TO PROSPECTIVE PURCHASERS

[75] Inventors: James S. W. Lee, Long Island, N.Y.; Chiu Keung Kwan, Kowloon, Hong Kong

[73] Assignee: C.J. Associates Ltd., Kowloon, Hong Kong

[21] Appl. No.: 944,819

[22] Filed: Oct. 6, 1997

[51] Int. Cl.[6] .............................. G09F 11/06; F16H 27/04

[52] U.S. Cl. .............................................. 40/500; 74/128

[58] Field of Search ................................ 40/500; 74/128

[56] References Cited

U.S. PATENT DOCUMENTS

| | | | |
|---|---|---|---|
| 439,329 | 10/1890 | Snyder | 40/500 |
| 658,997 | 10/1900 | Perret | 74/128 |
| 1,058,445 | 4/1913 | Leasing . | |
| 1,700,786 | 2/1929 | Dobrowsky | 40/500 |
| 2,444,971 | 7/1948 | Baker . | |
| 2,467,014 | 4/1949 | Dilks . | |
| 2,554,941 | 5/1951 | Dobrowsky . | |
| 2,889,644 | 6/1959 | Czapski . | |
| 3,026,640 | 3/1962 | Ogden . | |
| 3,218,743 | 11/1965 | Shneider | 40/500 |
| 3,745,843 | 7/1973 | Hetzel | 74/128 |
| 4,151,669 | 5/1979 | Yaginuma et al. | 40/500 |
| 4,206,658 | 6/1980 | Herr | 74/128 |
| 4,234,079 | 11/1980 | Otake . | |
| 4,383,453 | 5/1983 | Lehmann et al. | 74/128 |

FOREIGN PATENT DOCUMENTS

| | | | |
|---|---|---|---|
| 2501578 | 7/1976 | Germany | 74/128 |
| 973876 | 10/1964 | United Kingdom | 40/500 |

*Primary Examiner*—Kenneth J. Dorner
*Assistant Examiner*—Robert G. Santos
*Attorney, Agent, or Firm*—Laff, Whitesel, Conte & Saret, Ltd.

[57] ABSTRACT

Advertisement at the point of purchase is presented by a box containing a rotary device which displays graphic material on each step of the device. The rotary device is mounted in a box having a lens focused on the graphic material. A very low cost is achieved by a plastic plate shaped to form two cantilever springs, one of the cantilever springs has a tooth which steps the rotary drive into a viewing position, and the other of the cantilever springs has a tooth which stops the rotary device in a viewing position.

7 Claims, 2 Drawing Sheets

MEANS FOR AND METHODS OF CONVEYING INFORMATION TO PROSPECTIVE PURCHASERS

This invention relates to point of purchase advertising and, more particularly, to means for and methods of more interestingly displaying and conveying information to prospective purchasers.

There are many times when a person who is about to purchase something would like to know more information about it. There are, of course, many existing ways of conveying such information via brochures, sales pieces, or the like. However, many people do not want to read very much more than a minimum amount. Also, looking at a sales piece is common place and, therefore, not very exciting, even if it is read in detail.

Accordingly, there is a need for new and more exciting ways of conveying information at a point of purchase. Such a device should have something about it which excites great interest in a product without simultaneously distracting the purchaser so that he spends so much time studying the device conveying a message that he overlooks the message being conveyed.

The invention will find use any time that one wants to convey information at the point of purchase. However, the specific impetus to make the invention centers about a desire to inform children about toys and games. A child likes to visualize things that he will experience while he is at play. Thus, the point of purchase attraction to him might be a cartoon character, an animal, an action picture, or the like. Also, the device has to be simple and easy to use so that the child may quickly master its use.

Accordingly, an object of the invention is to provide new and improved point of purchase sales devices. In this connection, an object is to provide a device for conveying information at such a low cost that it is a throw-away device. Here, an object is to provide a point of purchase sales device which is so simple to operate that even a small child can instinctively use it with little or no adult supervision.

In keeping with an aspect of the invention, a box of any convenient size (such as about 1.6"×0.8"×0.8") has in one end a magnifying glass which focuses on pictures inside the box. A semi-transparent window in the top of the box admits light so that the pictures are clearly visible. The pictures are arranged on a rotary device, with the pictures positioned somewhat like the spokes of a wheel so that every time a push button is operated, the wheel rotates one incremental step, thereby presenting a new picture to view.

A preferred embodiment of the invention is shown in the attached drawings, in which.

Figure 1:
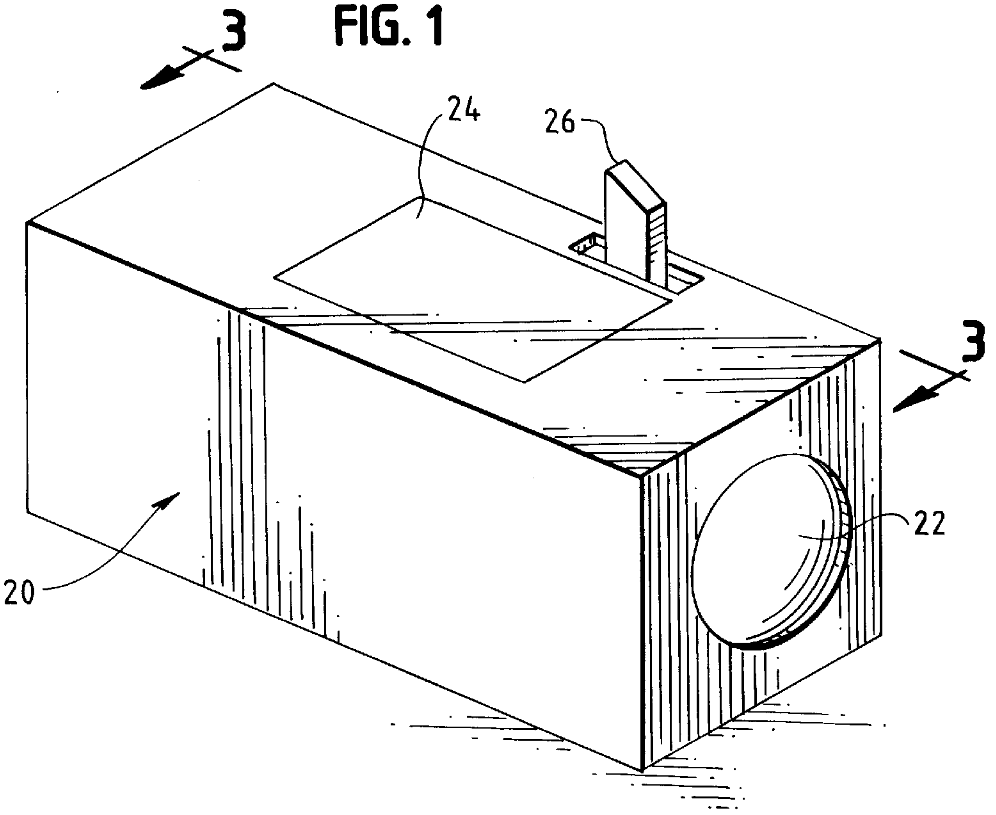
FIG. 1 is a perspective view of the inventive device.

The inventive device (FIG. 1) includes a low cost box 20 which may be made of plastic or cardboard, for example. Located in one end of the box 20 is a magnifying lens 22 having a focal length selected to focus the eye upon pictures inside the box. A semi-transparent window 24 in the top of the box admits light in order to illuminate the pictures and make viewing possible. A control-actuator 26 steps the rotary device 27 (FIG. 2), and thus the pictures, through a sequence while the person using the device looks through the lens.

Figure 2:
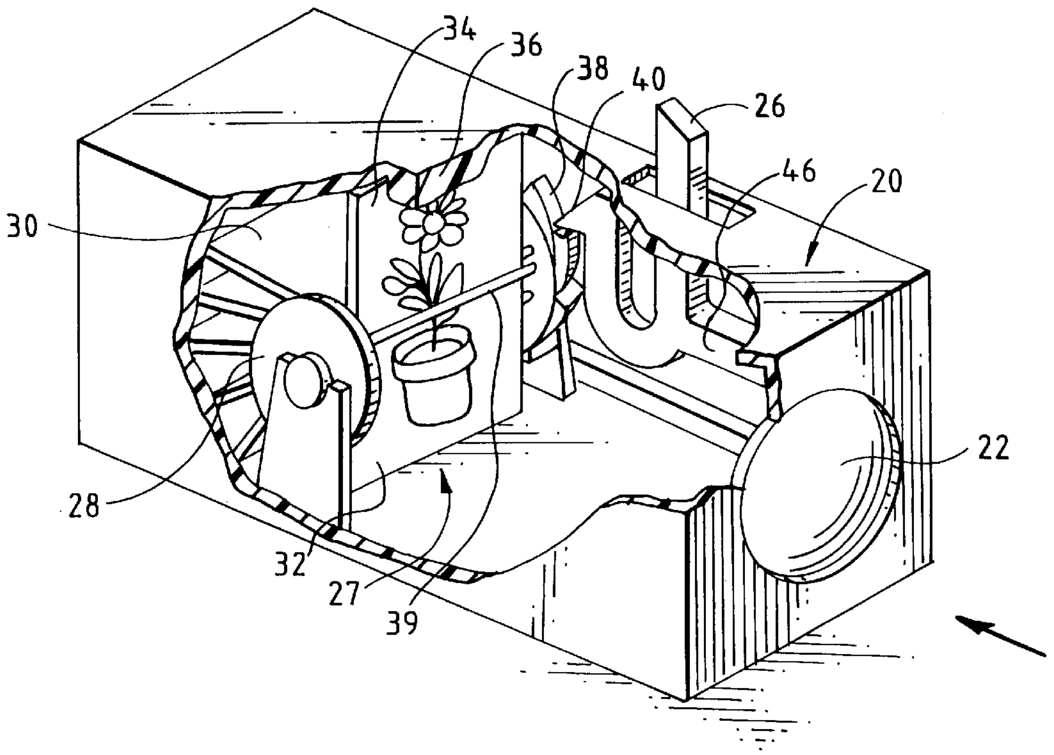
FIG. 2 is a similar perspective view broken away to show the relationship between parts forming the inner workings of the device.

FIG. 2 shows the relationship between parts forming the inner workings of the box. The wheel-like or rotary device 27 includes spaced parallel disks, such as 28, having pivotally attached thereto a plurality of cards with pictures or other graphic material thereon, the cards being mounted on the rotary device somewhat like the spokes of a wheel. As the rotary device 27 turns, the pictures are presented to the viewer in pairs, with one pair being presented at each indexing of the rotary device 27. A picture on the front of newly presented card 34 matches a picture on the back of the last preceding card 32. The newly presented card 34 is held in place by a detent 36 molded or otherwise formed on an inside surface of the box, here the underside of the top of the box. Hence, the total picture seen by the viewer is approximately twice as large as each of the individual cards.

A ratchet wheel 38 is located on the far side of the rotary device 27 and mounted on a common axle 39 shared by disk 28. Each time that the activator 26 is pushed down, a tooth 40 bears against the ratchet 38 to index the rotary device 27 one step. When moving over this step, the card 34 is pulled from behind the detent 36 so that it falls under gravity to the hanging position formerly occupied by card 32, and 30 is pulled to an upright position formerly occupied by card 34 behind the detent 36. This rotary movement exposes to view a new picture on the front of the next card 32 (FIG. 4) in the rotary device 27, and a new picture on the back of card 52.

The control-actuator 26 (FIGS. 3, 4) is a single molded plastic plate 44 which is supported and fixed within the box 20 as, for example, by fitting into a groove 45 formed inside the top panel and other grooves which run along the bottom and end of the box. The control-actuator 26 is, in effect, a push-button supported on the end of a cantilever spring 46. When the push-button 26 is pushed down (FIG. 4), the spring 46 flexes while tooth 40 presses down upon a tooth on the ratchet wheel 38. An indexing tooth 48 on another cantilevered spring 50 on plastic plate 44 stops the ratchet in a proper position relative to the display of the pictures on the rotary device 27.

Figure 3:
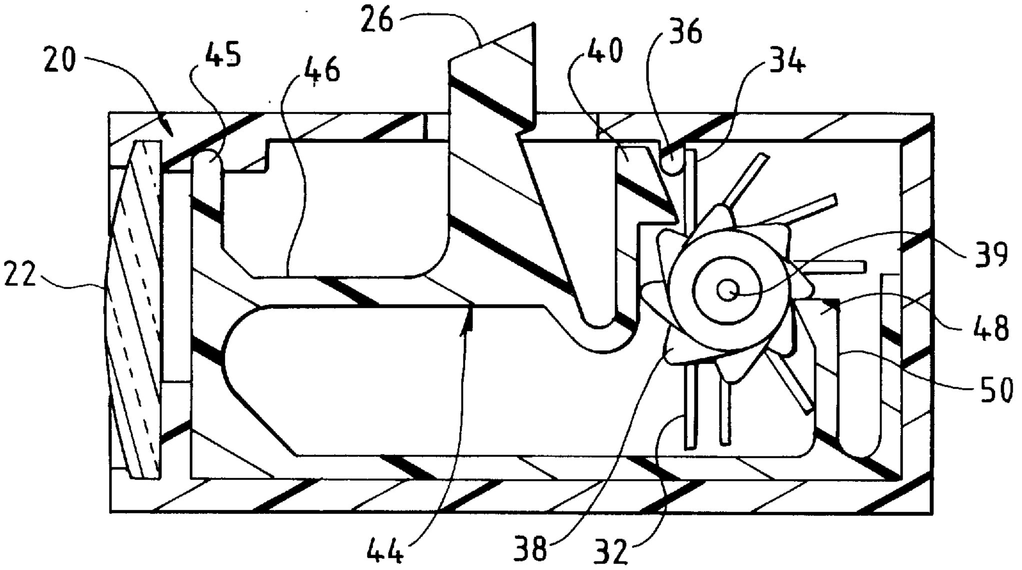
FIG. 3 is a cross-section, taken along line 3—3 of FIG. 1, showing an indexing mechanism at rest.
Figure 4:
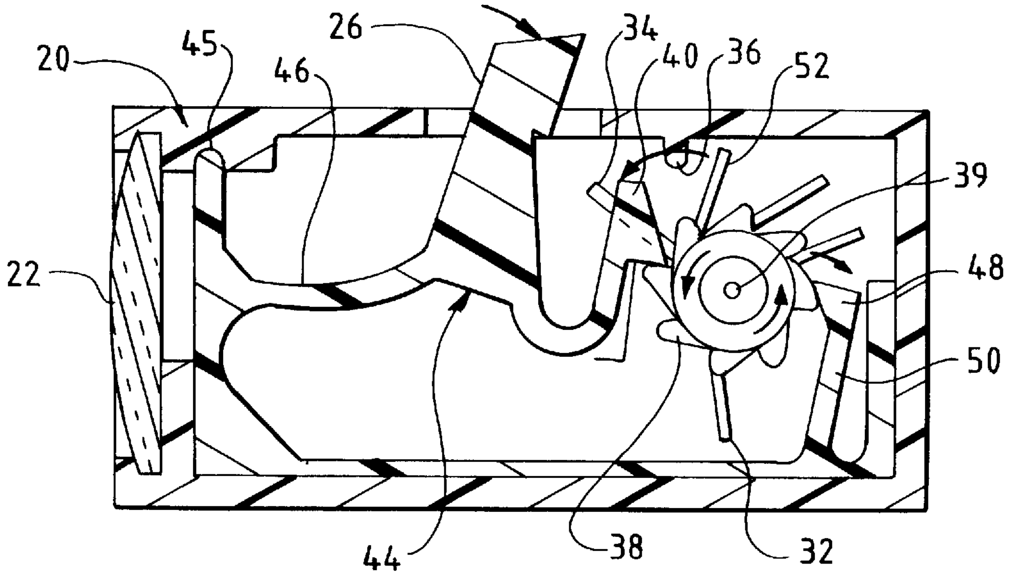
FIG. 4 is a similar cross-section showing a stop motion view of the indexing mechanism in an operated condition.

FIG. 3 shows the rotary device 27 in a normal position while the control-actuator 26 is at rest. The picture card 34 is held in a fixed position by the detent 36. The picture card 32 hangs under gravity. FIG. 4 shows the operation when the control-actuator 26 is pushed. Activator tooth 40 pushes a ratchet tooth to turn rotary device 27 as far as permitted by tooth 48. The turning of rotary device 27 pulls picture card 34 away from the detent 36, the card being shown in the process of falling to the bottom hanging position. Meanwhile, the picture 34 is being carried away from view and into the back of the rotary device 27. Soon the next card 52 will reach the detent 36 where it stops in a viewed position. By repeatedly pushing the actuator 26, the ratchet 38 is stepped so that all pictures on the rotary device are viewed.

It should now be apparent that the inventive device is a very simple and low cost mechanism so that it is possible to view it as a throw-away device.

Those who are skilled in the art will readily perceive how to modify the invention. Therefore, the appended claims are to be construed to cover all equivalent structures which fall within the true scope and spirit of the invention.

The claimed invention is:

1. A point of purchase information display device comprising a plurality of cards pivotally mounted on a rotary device, each of said cards carrying an image on both its front and back, said rotary device comprising a spaced parallel pair of disks mounted on a common axle with said cards suspended for a swinging motion between said pair of disks;

means for reviewing said images on said cards as presented to view; actuator means for turning said rotary device one step at a time in order to present said cards to view, said actuator means comprising a circular ratchet having a plurality of teeth associated with one of said disks, said ratchet moving said rotary device said one step at a time; and a plate supported in said device adjacent said ratchet, said plate being shaped to provide two cantilever springs each having a tooth individually associated therewith, one of said teeth rotating said rotary device one step each time the cantilever spring associated therewith is flexed, the other of said cantilever springs flexing with each rotation of said rotary device for placing the tooth associated therewith in a position to stop the rotating of said rotary device in a position to display at least one of said images; and means for flexing said one cantilever spring in response to a manual operation.

2. The device of claim 1 wherein a pair of said cards are presented to view on each step of said rotary device, and said means for viewing said images is a lens focused on said pair of cards presented to view, said view image being a combination of an image on the front of one card and the back of another card.

3. The device of claim 2 wherein said images are a graphic presentation of information relating to a product offered for sale at said point of purchase.

4. A box having a lens for viewing on pictures inside said box, a rotary device having a number of picture cards pivotally mounted thereon, a ratchet attached to said rotary device for stepping said rotary device one step per actuation, each step displaying another of said picture cards to view, a picture card held in an upright position on each step of said rotary device, another picture card hanging under gravity in a second position on each step of said rotary device, said upright position and said hanging position cooperating to show a pair of said picture cards as a single display, an actuator for moving said ratchet, said actuator comprising a plate having a shape which forms two teeth, a first tooth formed at one location on said plate for rotating said rotary device when said actuator is operated and a second tooth formed at another location on said plate for stopping said rotary device.

5. The box of claim 4 wherein said pictures are a graphic presentation of information relating to a product offered for sale.

6. The box of claim 4 wherein said plate is shaped to provide two cantilever springs, one of said cantilever springs associated with said first tooth and the other of said cantilever springs associated with said second tooth.

7. The box of claim 4 comprising a light transmitting panel for illuminating said upright and hanging picture cards.

* * * * *